(12) United States Patent
Bushey

(10) Patent No.: US 7,406,746 B2
(45) Date of Patent: Aug. 5, 2008

(54) SLIDER FOR HEAVY LOADS

(76) Inventor: Richard D. Bushey, 1596 38th Ave., Kenosha, WI (US) 53144

( * ) Notice: Subject to any disclaimer, the term of this patent is extended or adjusted under 35 U.S.C. 154(b) by 246 days.

(21) Appl. No.: 11/214,283

(22) Filed: Aug. 29, 2005

(65) Prior Publication Data

US 2006/0043725 A1    Mar. 2, 2006

Related U.S. Application Data

(60) Provisional application No. 60/605,876, filed on Aug. 31, 2004.

(51) Int. Cl.
*A47B 91/06* (2006.01)
(52) U.S. Cl. ...................................... 16/42 R
(58) Field of Classification Search ................. 16/42 R, 16/17.1; 198/326, 321; 248/188.8, 188.9, 248/346.11, 188.3, 188.4; D8/374, 375; 280/610, 842, 845; 428/49–52, 168, 172
See application file for complete search history.

(56) References Cited

U.S. PATENT DOCUMENTS

| | | | |
|---|---|---|---|
| 931,378 A | 8/1909 | Booth | |
| 1,069,141 A | 8/1913 | Jones | |
| D44,952 S | 12/1913 | Buser | |
| 1,603,876 A | 10/1926 | Shapard | |
| D75,465 S | 6/1928 | Bach | |
| 1,861,095 A | 5/1932 | Schacht | |
| 1,867,736 A | 7/1932 | Finkeldey | |
| 1,903,609 A | 4/1933 | Uhl | |
| 1,915,272 A | 6/1933 | Duncan, Jr. | |
| 1,917,425 A * | 7/1933 | Borden | 16/17.1 |
| 1,982,138 A | 11/1934 | Herold | |
| 2,030,649 A | 2/1936 | Miller | |
| 2,262,063 A | 11/1941 | Swarr | |
| 2,262,064 A | 11/1941 | Swarr | |
| 2,317,080 A | 4/1943 | Phillips | |
| 2,568,477 A | 9/1951 | Westlund | |
| 2,633,599 A | 4/1953 | Dolan | |
| 2,644,978 A | 7/1953 | Becker | |
| 2,710,027 A | 6/1955 | Husgen et al. | |
| 2,717,410 A | 9/1955 | Holloman | |
| 2,753,586 A | 7/1956 | Metz | |
| 2,787,085 A | 4/1957 | Auer | |
| 2,794,205 A | 6/1957 | Skupas | |
| 2,820,240 A | 1/1958 | Matys | |
| 2,840,113 A | 6/1958 | Simpson et al. | |
| 2,848,733 A | 8/1958 | Thronsbury | |
| 2,865,133 A | 12/1958 | Hoven | |
| 2,875,552 A | 3/1959 | Stillman | |
| 2,878,509 A | 3/1959 | Fisher | |
| 2,886,918 A | 5/1959 | Bayley et al. | |
| 2,996,753 A | 8/1961 | Kramcsak, Jr. | |
| 3,059,267 A | 10/1962 | Wilhelmi | |
| 3,078,498 A | 2/1963 | Morgan | |

(Continued)

*Primary Examiner*—Chuck Y. Mah
(74) *Attorney, Agent, or Firm*—Boyle Fredrickson, S.C.

(57) ABSTRACT

A slider and method of using the same is provided for facilitating the sliding of a load on a supporting surface. The slider includes a support platform having an upper surface for receiving the load thereon and a lower surface. A plurality of slider elements depend from the lower surface of the support platform. Each slider element has an outer surface engageable with the supporting surface. A lubricating pad extends from the support platform and is engageable with the supporting surface for lubricating the supporting surface during movement of the slider.

18 Claims, 4 Drawing Sheets

U.S. PATENT DOCUMENTS

| | | |
|---|---|---|
| 3,080,601 A | 3/1963 | Kramcsak, Jr. |
| 3,126,666 A | 3/1964 | Petersen |
| 3,177,518 A | 4/1965 | Bergstrom |
| 3,183,545 A | 5/1965 | Bergstrom |
| 3,191,212 A | 6/1965 | Reiss, Sr. et al. |
| 3,311,338 A | 3/1967 | Culley |
| 3,326,508 A | 6/1967 | Born |
| 3,342,445 A | 9/1967 | Bouwkamp |
| 3,353,231 A | 11/1967 | Levine |
| 3,389,421 A | 6/1968 | Wheeler |
| D214,642 S | 7/1969 | Kettell |
| 3,452,497 A * | 7/1969 | Warp .......................... 52/177 |
| 3,505,724 A | 4/1970 | Leitner et al. |
| 3,623,184 A | 11/1971 | Mazur |
| 3,640,496 A | 2/1972 | Duncan |
| 3,845,924 A | 11/1974 | Wheese |
| 3,883,923 A | 5/1975 | England |
| 4,089,498 A | 5/1978 | Woodruff |
| 4,124,917 A | 11/1978 | Gilliland |
| 4,206,570 A | 6/1980 | Cooper |
| 4,327,460 A | 5/1982 | Wolff |
| 4,468,910 A | 9/1984 | Morrison |
| D276,606 S | 12/1984 | Neuwirth |
| 4,576,357 A | 3/1986 | Schrepfer |
| 4,585,289 A | 4/1986 | Vidas |
| 4,654,245 A | 3/1987 | Balzer et al. |
| D302,939 S | 8/1989 | Ruskin |
| 5,005,374 A | 4/1991 | Spitler |
| 5,010,621 A | 4/1991 | Bock |
| 5,018,695 A | 5/1991 | Bishop |
| 5,042,764 A | 8/1991 | Carpinella et al. |
| 5,057,356 A | 10/1991 | Smith |
| 5,081,740 A | 1/1992 | Smith |
| 5,094,416 A | 3/1992 | Huon |
| 5,120,587 A * | 6/1992 | McDermott, III et al. .. 428/40.6 |
| 5,135,273 A | 8/1992 | MacCalder |
| 5,170,972 A | 12/1992 | Guell |
| 5,191,676 A | 3/1993 | Gerner |
| 5,220,705 A | 6/1993 | Bushey |
| D339,560 S | 9/1993 | Byrd |
| D348,985 S | 7/1994 | Walker |
| D353,505 S | 12/1994 | Rea |
| 5,426,818 A | 6/1995 | Bushey |
| 5,469,599 A | 11/1995 | Wurdack |
| 5,557,824 A | 9/1996 | Bushey |
| 5,573,212 A | 11/1996 | Palazzolo |
| 5,573,213 A | 11/1996 | Henderson et al. |
| D376,944 S | 12/1996 | Dunn |
| 5,591,974 A | 1/1997 | Troyer et al. |
| D379,299 S | 5/1997 | Fitzgibbons |
| D381,865 S | 8/1997 | Gallagher |
| 5,680,673 A | 10/1997 | Beshore |
| 5,782,444 A | 7/1998 | Anderman et al. |
| 5,802,669 A | 9/1998 | Wurdack |
| D400,088 S | 10/1998 | Hurrie |
| 5,863,845 A * | 1/1999 | Owen .......................... 442/101 |
| 5,991,974 A | 11/1999 | Carpinella |
| 6,016,588 A | 1/2000 | Kamerschen |
| 6,022,617 A * | 2/2000 | Calkins ....................... 428/354 |
| 6,088,877 A | 7/2000 | Swy et al. |
| 6,120,072 A | 9/2000 | Benedict |
| 6,136,377 A | 10/2000 | Sovell |
| D434,279 S | 11/2000 | Bushey |
| 6,154,923 A | 12/2000 | Carpinella |
| 6,161,252 A | 12/2000 | Rodriguez |
| 6,280,817 B1 | 8/2001 | McCrossin et al. |
| 6,287,817 B1 | 9/2001 | McCrossin et al. |
| 6,324,725 B1 | 12/2001 | Green |
| D455,383 S | 4/2002 | Sneed |
| 6,405,982 B2 | 6/2002 | Ferencz |
| 6,866,338 B2 | 3/2005 | Mendenhall et al. |
| 6,910,246 B2 | 6/2005 | Desmarais |

* cited by examiner

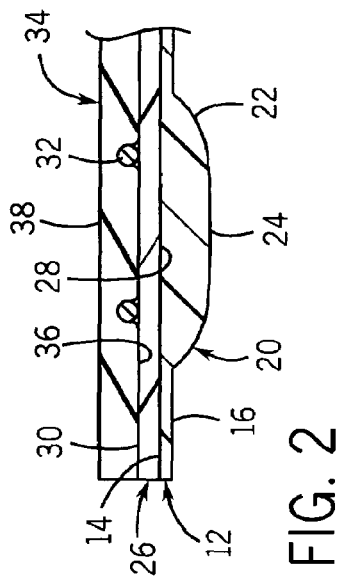
FIG. 1
FIG. 2
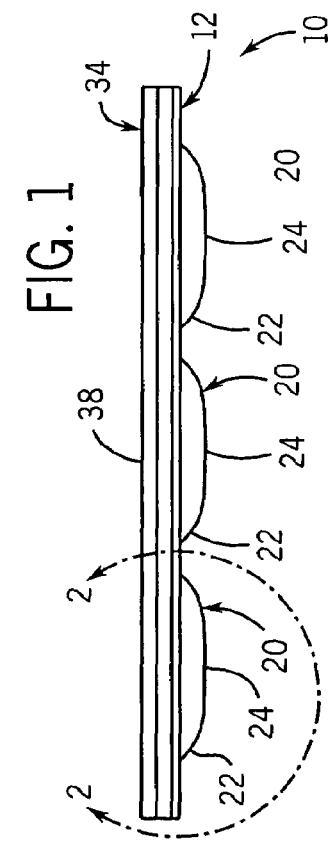
FIG. 3
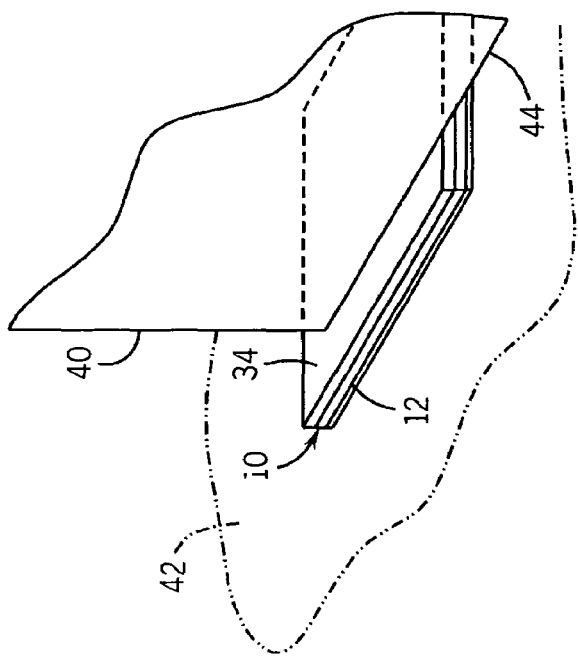
FIG. 4

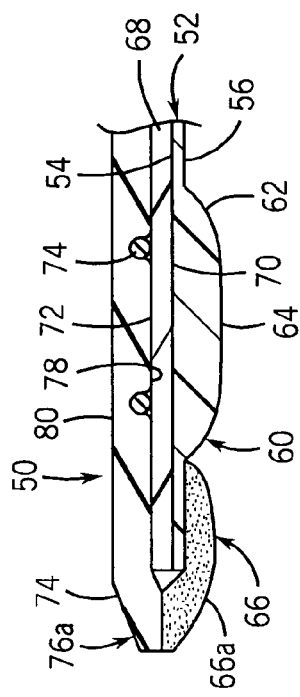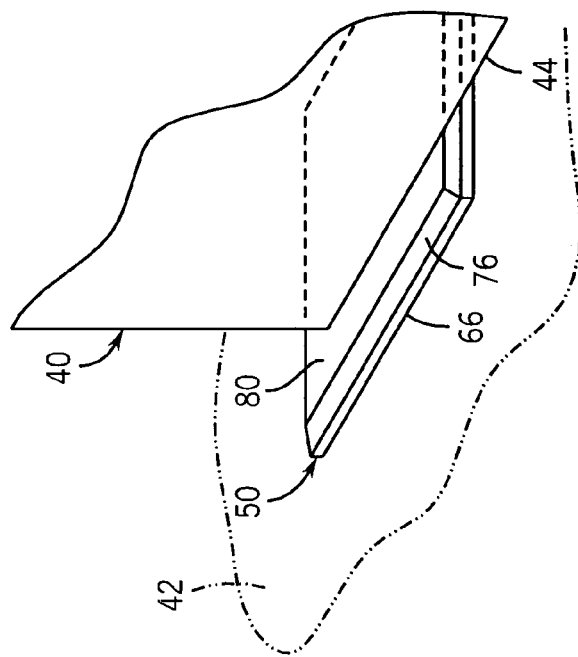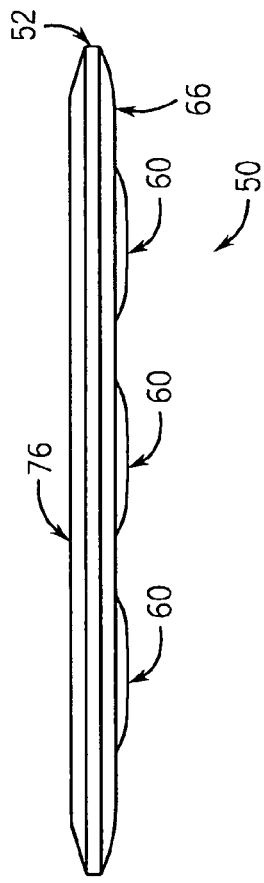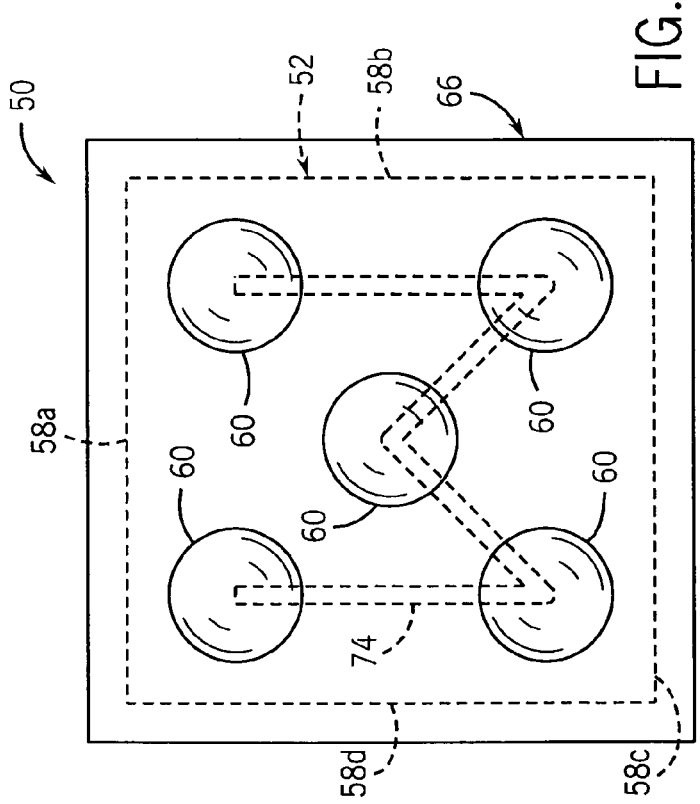

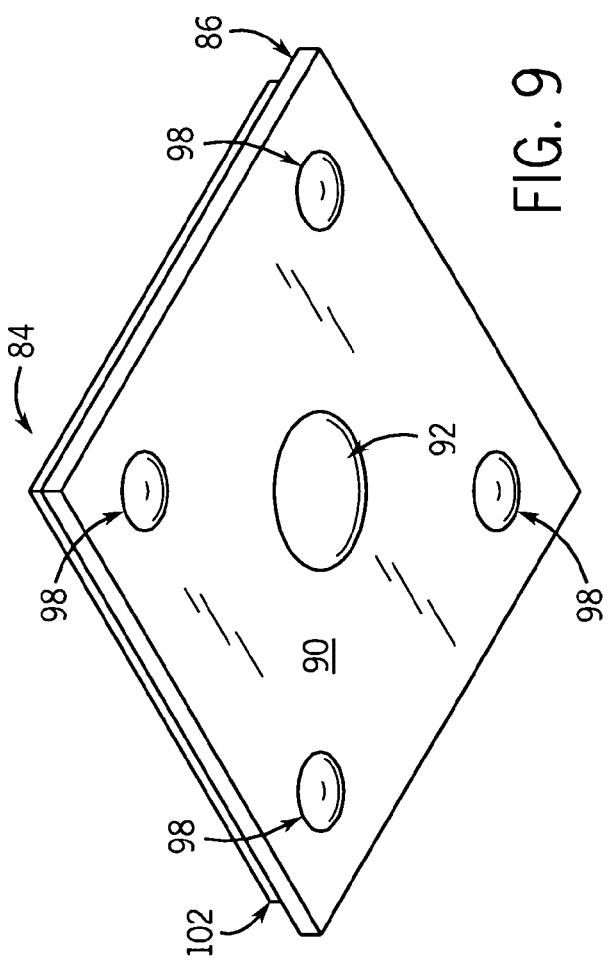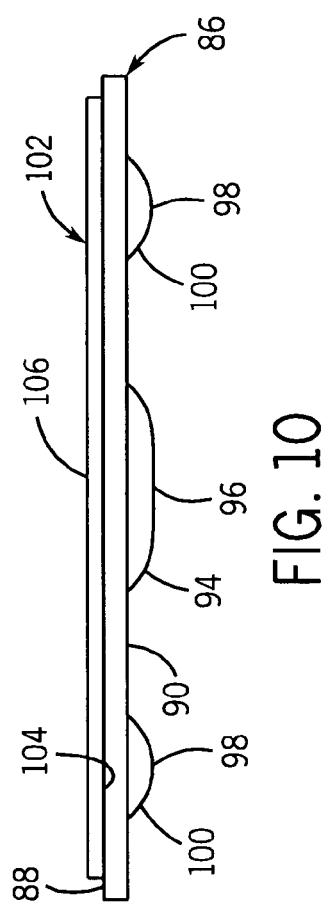

SLIDER FOR HEAVY LOADS

CROSS-REFERENCE TO RELATED APPLICATIONS

This application claims the benefit of U.S. Provisional Application Ser. No. 60/605,876, filed Aug. 31, 2004.

FIELD OF THE INVENTION

This invention relates generally to sliders, and in particular, to a slider positionable underneath a heavy load for transporting such load over a supporting surface such as a factory floor or the like.

BACKGROUND OF THE INVENTION

Sliders are often mounted to the bottom surface of a load to act as a buffer between the load and the surface on which the load rests. Typically, sliders take the form of convex discs mounted to the bottom surface of the load by means of adhesive, nails, or the like. The slider disperses the weight of the load over an enlarged area and allows the load to be slid over the supporting surface. Further, the slider prevents the scratching or marring of the supporting surface when the load is moved and prevents the forming of a depression in the supporting surface when the load remains in one place for an extended period of time.

While functional for their intended purpose, prior sliders have certain limitations. More specifically, repeated movement of the load along a supporting surface may cause the connection means that attaches the slider to the load to fail such that the slider may become detached from the bottom of the load. This, in turn, may result in the load engaging the floor and becoming damaged. Alternatively, prior sliders may not function properly on high friction surfaces such as a concrete factory floor. Consequently, prior sliders are not often used to move heavy loads across concrete factory floors. Further, if these floor sliders are used on a high friction floor, the load may become detached from the sliders and engage the floor. Once again, this may result in the load becoming damaged. Therefore, it is a highly desirable to provide a slider that may be simply and easily secured to the bottom surface of a heavy load and that facilitates sliding of such load along a high friction surface such as a concrete factory floor.

Therefore, it is a primary object and feature of the present invention to provide a slider that may be securely maintained beneath a bottom surface of a load.

It is a further object and feature of the present invention to provide a slider that is inexpensive to manufacture and simple to utilize.

It is a still further object and feature of the present invention to provide a slider that facilitates the sliding of a load over a wide variety of supporting surfaces.

In accordance with the present invention, a slider is provided for facilitating the sliding of a load on a supporting surface. The slider includes a base having an upper surface for supporting the load and a lower surface. A plurality of slider elements extends from the lower surface of the base. Each slider element has a generally arcuate outer surface that is engageable with the supporting surface.

The slider also includes a support having an upper surface and a lower surface interconnected to the upper surface of the base. A pad has an upper surface for engagement with the load and a lower surface interconnected to the upper surface of the support. The upper surface of the pad has a high co-efficient of friction. A rigid wire is positioned between the upper surface of the support and the lower surface of the pad. The wire partially overlaps the slider elements.

It is contemplated for each slider element to terminate at a generally flat apex. It is also contemplated for the slider to include a lubricating pad depending from the lower surface of the base. The lubricating pad is engageable with the supporting surface for lubricating the supporting surface. A first slider element of the plurality of slider elements may have a predetermined radius and a second slider element of the plurality of slider elements may also have a predetermined radius. The predetermined radius of the first slider is greater than the predetermined radius of the second slider.

The slider may also include a generally flat mat having an opening therethough. The base is receivable in the opening of the mat. The mat has an upper surface, a lower surface and on outer edge. A ramp may be operatively connected to the outer edge of the mat. The ramp has an upper edge lying in a generally common plane with the upper surface of the mat and a lower edge adjacent the supporting surface.

In accordance with a further aspect of the present invention, a slider is provided for facilitating the sliding of a load on a supporting surface. The slider includes a support platform having an upper surface for receiving the load thereon and a lower surface. A plurality of slider elements extends from the lower surface of the support platform. Each slider element has an outer surface engageable with the supporting surface. A lubricating pad depends from the lower surface of the supporting platform and is engageable with the supporting surface for lubricating the supporting surface.

The support platform includes an upper layer having an upper surface defining the upper surface of the support platform and a lower surface; an intermediate layer having an upper surface bonded to the lower surface of the upper layer and a lower surface; and a lower layer having an upper surface bonded to the lower surface of the intermediate layer and a lower surface defining the lower surface of the support platform. The upper layer is formed from a resilient pad such that the upper surface of the upper layer has a high co-efficient of friction. A rigid wire is positioned between the upper layer of the support platform and the intermediate layer of the support platform. The wire partially overlaps the slider elements.

It is contemplated for each slider element to terminate at a generally flat apex. It is also contemplated for a first slider element of the plurality of slider elements to have a predetermined radius and for a second slider element of the plurality of slider elements to also have a predetermined radius. The predetermined radius of the first slider is greater than the predetermined radius of the second slider.

The slider may also include a generally flat mat having an opening therethough. The support platform is receivable in the opening of the mat. The mat has an upper surface, a lower surface and on outer edge. A ramp may be operatively connected to the outer edge of the mat. The ramp has an upper edge lying in a generally common plane with the upper surface of the mat and a lower edge adjacent the supporting surface.

In accordance with a still further aspect of the present invention, a method is provided for sliding a load over a supporting surface. The method includes the steps of providing a slider having a first side for receiving the load thereon and a second side engageable with the supporting surface, and depositing a lubricant adjacent the slider as the load is slid on the slider over the supporting surface.

The slider includes a support platform having an upper surface for receiving the load thereon and a lower surface, and a plurality of slider elements extending from the lower surface of the support platform. Each slider element has an outer surface engageable with the supporting surface. The support platform includes a resilient pad having an upper surface that defines the upper surface of the support platform and a lower surface, and a base having an upper surface affixed to the lower surface of the pad and a lower surface that defines the lower surface of the support platform.

The method may include the additional steps of reinforcing the support platform and depositing the slider within an opening in a mat. The mat has upper and lower surfaces. Advertising indicia may be placed on the upper surface of the mat. The step of reinforcing the support platform includes the additional step of positioning a wire between the resilient pad and the base.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a side elevational view of a first embodiment with a slider in accordance with the present invention;

FIG. 2 is an enlarged, cross-sectional view of the slider of FIG. 1;

FIG. 3 is a bottom plan view of the slider of FIG. 1;

FIG. 4 is an isometric view of the slider of FIG. 1 having a load positioned thereon;

FIG. 5 is a cross-sectional view of a second embodiment of the slider in accordance with the present invention;

FIG. 6 is an enlarged, cross-sectional view showing the slider of FIG. 5;

FIG. 7 is a bottom plan view of the slider of FIG. 5;

FIG. 8 is an isometric view of the slider of FIG. 5 having a load positioned thereon;

FIG. 9 is an isometric view of a third embodiment of the slider in accordance with the present invention;

FIG. 10 is a side elevational view of the slider of FIG. 9;

DETAILED DESCRIPTION OF THE DRAWINGS

Figure 11:
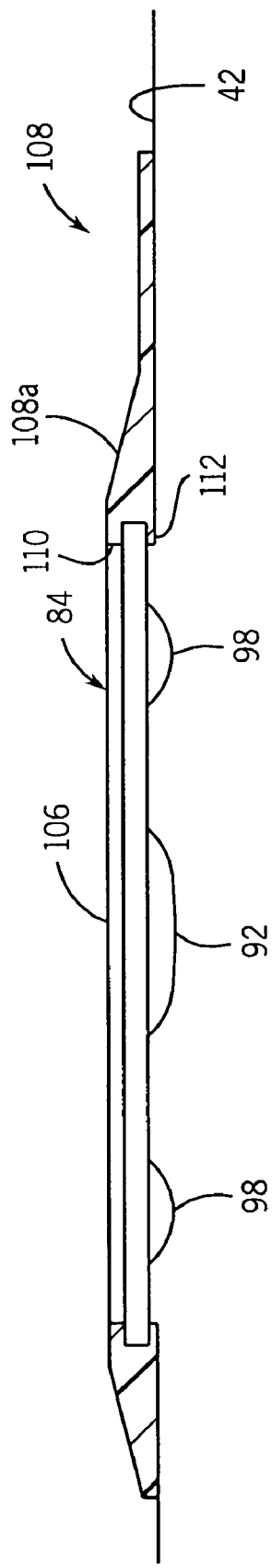
FIG. 11 is a side elevational view of the slider of FIG. 9 received within a boarder.

Referring to FIGS. 1-4, a slider in accordance with the present invention is generally designated by the reference numeral 10. Slider 10 includes a generally flat base 12 having a generally flat upper surface 14 and a generally flat lower surface 16. In the depicted embodiment, base 12 has a generally square configuration defined by sides 18a-18d. A plurality of slider elements 20 depend from and are integral with lower surface 16 of base 12. Each slider element 20 includes a generally arcuate floor engaging surface 22 terminating at a generally flat apex 24.

Slider 10 further includes a generally flat, rigid support 26 having lower surface 28 affixed to upper surface 14 of base 12 and upper surface 30. Support 26 has a generally square configuration and overlaps base 12. It is contemplated to interconnect lower surface 28 of support 26 and upper surface 14 of base 12 with an adhesive. Rigid wire 32 is patterned on upper surface 30 of support 26 and maintained thereon by a generally square, resilient pad 34. Pad 34 has a lower surface 36 affixed to upper surface 30 of support 26 by any suitable means such as an adhesive or the like and an upper surface 38. It is intended that pad 34 be formed from a material having a high co-efficient of friction, for reasons hereinafter described.

In operation, load 40 is positioned on supporting surface 42 such as a concrete factory floor or the like. Slider 10 is positioned between lower surface 44 of load 40 and supporting surface 42 such that lower surface 44 of load 40 engages upper surface 38 of pad 34 and such that apexes 24 of slider elements 20 of base 12 engage supporting surface 42. The process is repeated until a plurality of sliders 10 are positioned between load 40 and supporting surface 42. It can be appreciated that wire 32 of slider 10 acts as a spacer to prevent resilient pad 34 from fully compressing whereby the cell structure of pad 34 would be crushed. While wire 32 is formed in a W-shape, other shapes are possible without deviating from the scope of the present invention.

Once load 40 is deposited on one or more sliders 10, as heretofore described, load 40 may be slid over supporting surface 42. It is noted that due to the resilient nature of pad 34, lower surface 44 of load 40 remains in contact with upper surface 58 of pad 34 in the event that load 40 is slid over an uneven portion of supporting surface 42. Further, since pad 34 is formed from a material having a high co-efficient of friction, load 40 is maintained on upper surface 38 on pad 34 as load 40 slides across supporting surface 42. In the preferred embodiment, upper surface 38 of pad 34 is free of adhesives so as to allow slider 10 to be re-used to move another load.

Referring to FIGS. 5-8, an alternate embodiment of a slider in accordance with the present invention is generally designated by the reference numeral 50. Slider 50 includes a generally flat base 52 having a generally flat upper surface 54 and a generally flat lower surface 56. In the depicted embodiment, base 52 has a generally square configuration defined by sidewalls 58a-58d. A plurality of slider elements 60 depend from and are integral with lower surface 56 of base 52. Each slider element 60 includes a generally arcuate floor engaging surface 62 terminating at a generally flat apex 64. A lubricating pad 66, depends from lower surface 56 of base 52 and surrounds the outer periphery of slider elements 60. Lubricating pad 66 includes an outer periphery 66a that extends radially from sides 58a-58d of base 52. It is contemplated for lubricating pad 66 to have a thickness greater than the thickness of slider elements 60, for reasons hereinafter described and to be impregnated with a lubricant such as water, soapy water, or the like.

Slider 10 further includes a generally flat rigid support having lower surface 70 affixed to upper surface 54 of base 52 and upper surface 72. Support 68 has a generally square configuration and overlaps base 12. It is contemplated to interconnect lower surface 70 of support 68 to upper surface 54 of base 52 with an adhesive or the like. Rigid wire 74 is patterned on upper surface 72 of support 68 and maintained thereon by a generally square, resilient pad 76. Pad 76 has a lower surface 78 affixed to upper surface 72 of support 68 by any suitable means such as an adhesive or the like and an upper surface 80. Pad 76 extends radially from sides 58a-58d of base 18 such that lower surface 78 of pad 76 adjacent outer periphery 76a of pad 76 is affixed to outer periphery 68a of lubricating pad 66. It is intended that pad 76 be formed from a material having a high co-efficient of friction, for reasons hereinafter described.

In operation, load 40 is positioned on supporting surface 42 such as a concrete factory floor or the like. Slider 50 is positioned between lower surface 44 of load 40 and supporting surface 42, such that lower surface 44 of load 40 engages upper surface 80 of pad 76 and such that apexes 64 of slider elements 60 engage supporting surface 42. As heretofore described, given that the thickness of lubricating pad 66 is greater than the thickness of the slider element 60, lubricating pad 66 is compressed under the weight of load 40 thereby releasing the lubricant captured therein. The process is repeated until a plurality of sliders 50 are positioned between load 40 and supporting surface 42. It can be appreciated that wire 74 of slider 50 acts as a spacer to prevent resilient pad 76 from compressing fully when exposed to the weight of load 40 to prevent the crushing of the cell structure thereof. While wire 74 is formed in a W shape, other shapes are possible without deviating from the scope of the present invention.

Once load 40 is deposited on one or more sliders 50, as heretofore described, the load may be slid over supporting surface 42. It is noted that due to the resilient nature of pad 76, lower surface 44 of load 40 remains in contact with upper surface 80 of pad 76 in the event that load 40 is slid over an uneven portion of supporting surface 42. Further, since pad 76 is formed from material having a high co-efficient of friction, load 40 is maintained on upper surface 80 of pad 76 as load 40 slides across supporting surface 42. In the preferred embodiment, upper surface 80 of pad 76 is free of adhesives so as to allow slider 50 to be re-used to move another load.

Referring to FIGS. 9-13, a still further embodiment of a slider in accordance with the present invention is generally designated by the reference numeral 84. Slider 84 includes a generally flat base 86 having a generally flat upper surface 88 and a generally flat lower surface 90. In the depicted embodiment, base 86 has a generally square configuration, but other configurations are possible without deviating from the scope of the present invention.

A central slider element 92 depends from and is integral with lower surface 90 of base 86 at a central location thereof. Slider element 92 includes a generally arcuate floor engaging surface 94 terminating at a generally flat apex 96. In addition, a plurality of secondary sliders 98 depend from and are integral with lower surface 90 of base 86 at locations adjacent the outer periphery of base 86. Each secondary slider element 98 includes a generally arcuate floor engaging surface 100. It is contemplated to affix resilient pad 102 to upper surface 88 of base 86. Resilient pad 102 includes a lower surface 104 affixed to upper surface 88 of base 86 in any suitable manner such as by an adhesive or the like and an upper surface 106. It is intended that pad 102 be formed from a material having a high co-efficient of friction, for reasons hereinafter described.

Figure 12:
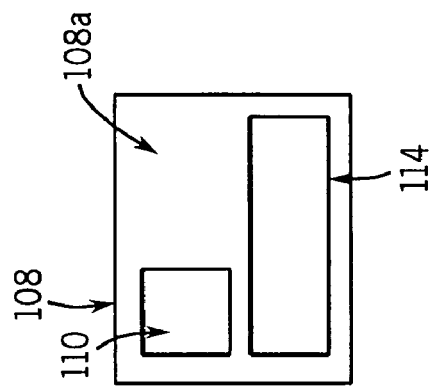
FIG. 12 is a top plan view of the boarder of FIG. 11.
Figure 13:
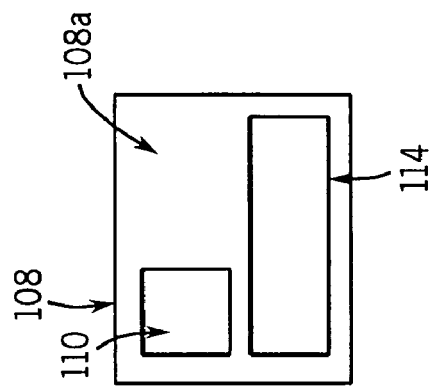
FIG. 13 is an alternate embodiment of a boarder for receiving the slider of FIG. 9.

Referring to FIGS. 11-13, it is intended to provide a flexible boarder 108 for housing slider 84. Boarder 108 includes opening 110 therein having a configuration corresponding to the outer periphery of slider 84. Ledge 112 extends radially into opening 110 to provide a support surface for receiving slider 84 thereon. Boarder 108 further includes a ramp portion 108a that provides a transition between supporting surface 42 and upper surface 106 of resilient pad 102 of slider 84, for reasons hereinafter described. Bumper 108 may also include a display window 114 for receiving advertising indicia therein.

In operation, slider 84 is deposited within opening 110 in boarder 108 such that the outer periphery of lower surface 90 of base 86 engages ledge 112 of boarder 108. Thereafter, load 40 may be positioned on upper surface 108 of resilient pad 102 of slider 84. Ramp portion 108a of boarder 108 facilitates the positioning of load 40 on upper surface 106 of resilient pad 102 of slider 84. By way of example, it is contemplated for load 40 to take the form of an automobile having each tire positioned on a corresponding slider 84. As such, display window 114 may be utilized to provide advertising information on the vehicle. With the vehicle deposited on sliders 84, a user is free to slide the vehicle about supporting surface 42 within a showroom.

Various alternatives are contemplated as being within the following claims particularly pointing out and distinctly claiming the subject matter regarded as the invention.

I claim:

1. A slider for facilitating the sliding of a load on a supporting surface, comprising:
    a base having an upper surface for supporting the load and a lower surface;
    a plurality of slider elements extending from the lower surface of the base, each slider element having a generally arcuate outer surface engageable with the supporting surface;
    a pad having an upper surface for engagement with the load and a lower surface directed towards the base; and
    an elongated, rigid wire positioned between the upper surface of the base and the lower surface of the pad, the wire passing over each of the plurality of slider elements.

2. The slider of claim 1 further comprising a support having an upper surface and a lower surface interconnected to the upper surface of the base.

3. The slider of claim 2 wherein the lower surface of the pad is interconnected to the upper surface of the support, and wherein the upper surface of the pad has a high co-efficient of friction.

4. The slider of claim 3 wherein the rigid wire is positioned between the upper surface of the support and the lower surface of the pad.

5. The slider of claim 1 wherein each of the slider elements terminates at a generally flat apex.

6. The slider of claim 1 further comprising a lubricating pad depending from the lower surface of the base and engageable with the supporting surface for lubricating the supporting surface.

7. The slider of claim 1 wherein a first slider of the plurality of sliders has a predetermined radius and a second slider of the plurality of sliders has a predetermined radius, wherein the predetermined radius of the first slider is great than the predetermined radius of the second slider.

8. The slider of claim 1 further comprising a generally flat mat having an opening therethough, the base receivable in the opening of the mat.

9. The slider of claim 8 wherein the mat has an upper surface, a lower surface and on outer edge, and wherein the slider further comprises a ramp operatively connected to the outer edge of the mat, the ramp having an upper edge lying in a generally common plane with the upper surface of the mat and a lower edge adjacent the supporting surface.

10. A slider for facilitating the sliding of a load on a supporting surface, comprising:
    a support platform having an upper surface for receiving the load thereon and a lower surface; the support platform includes:
        an upper layer having an upper surface defining the upper surface of the support platform and a lower surface;
        an intermediate layer having an upper surface bonded to the lower surface of the upper layer and a lower surface; and
        a lower layer having an upper surface bonded to the lower surface of the
        intermediate layer and a lower surface defining the lower surface of the support platform;
    a plurality of slider elements extending from the lower surface of the support platform, each slider element having an outer surface engageable with the supporting surface; and a rigid wire positioned between the upper layer of the support platform and the intermediate layer of the support platform, the rigid wire passing over each of the plurality of slider elements.

11. The slider of claim 10 wherein the upper layer is formed from a resilient pad such that the upper surface of the upper layer has a high co-efficient of friction.

12. The slider of claim 10 wherein each of the slider elements terminates at a generally flat apex.

13. The slider of claim 12 wherein a first slider of the plurality of sliders has a predetermined radius and a second slider of the plurality of sliders has a predetermined radius, wherein the predetermined radius of the first slider is great than the predetermined radius of the second slider.

14. The slider of claim 10 further comprising a generally flat mat having an opening therethough, the support platform receivable in the opening of the mat.

15. The slider of claim 14 wherein the mat has an upper surface, a lower surface and on outer edge, and wherein the slider further comprises a ramp operatively connected to the outer edge of the mat, the ramp having an upper edge lying in a generally common plane with the upper surface of the mat and a lower edge adjacent the supporting surface.

16. A method of sliding a load over a supporting surface, comprising the steps of:
   providing a slider having a first side for receiving the load thereon and a second side engageable with the supporting surface, the slider including:
   a support platform having an upper surface for receiving the load thereon and a lower surface; the support platform including:
      a resilient pad having an upper surface defining the upper surface of the support platform and a lower surface;
      a base having an upper surface affixed to the lower surface of the pad and a lower surface defining the lower surface of the support platform; and
   a plurality of slider elements extending from the lower surface of the support platform, each slider element having an outer surface engageable with the supporting surface; and
   positioning a wire between the resilient pad and the base, the wire passing over the plurality of slider elements;
   depositing the load on the upper surface of the support platform; and
   sliding the load on the slider over the supporting surface.

17. The method of claim 16 comprising the additional step of depositing the slider within an opening in a mat, the mat having upper and lower surfaces.

18. The method of claim 17 comprising the additional step of providing advertising indicia on the upper surface of the mat.

* * * * *